United States Patent [19]

Höfler

[11] Patent Number: 4,646,443
[45] Date of Patent: Mar. 3, 1987

[54] AUTOMATIC GEAR TESTING APPARATUS

[76] Inventor: Willy Höfler, Erich-Heckel-Strasse 22, D-7500 Karlsruhe 41, Fed. Rep. of Germany

[21] Appl. No.: 802,069

[22] Filed: Nov. 26, 1985

Related U.S. Application Data

[63] Continuation of Ser. No. 609,071, May 10, 1984, abandoned.

[30] Foreign Application Priority Data

Jul. 30, 1983 [DE] Fed. Rep. of Germany ....... 3327549

[51] Int. Cl.$^4$ .......................................... G01M 13/02
[52] U.S. Cl. .................................. 33/179.5 R; 73/162
[58] Field of Search .............. 33/179.5, 172 E, 169 R, 33/556–561; 73/162

[56] References Cited

U.S. PATENT DOCUMENTS

| 3,905,119 | 9/1975 | Meyding | 33/179.5 R |
| 3,936,946 | 2/1976 | Ruffner et al. | 33/179.5 R |
| 3,945,124 | 3/1976 | Jacoby et al. | 33/174 L |
| 4,228,591 | 10/1980 | Sterki et al. | 33/174 P |
| 4,274,207 | 6/1981 | Flair | 33/179.5 R |

FOREIGN PATENT DOCUMENTS 3212081 10/1983 Fed. Rep. of Germany .

Primary Examiner—Charles Frankfort
Assistant Examiner—Patrick R. Scanlon
Attorney, Agent, or Firm—Edwin E. Greigg

[57] ABSTRACT

An automatic apparatus for testing the spacing of gear teeth in a gear wheel is disclosed, in which the spacing testing is performed for both the left and right flanks of the teeth in a single gear revolution, and the switchover or deflection of the two measuring feelers from one flank to the other against fixed stops is avoided, thereby preventing shocks and vibrations in that measuring position that could produce incorrect measurements.

3 Claims, 12 Drawing Figures

AUTOMATIC GEAR TESTING APPARATUS

This is a continuation of copending application Ser. No. 609,071 filed May 10, 1984 now abandoned.

BACKGROUND OF THE INVENTION

The invention relates to an automatic testing apparatus for testing the circumferential spacing of gear teeth on the circumference of gear wheels, in which for the testing operation the gear wheel is made to rotate uninterruptedly in one rotational direction at low speed by means of a power source, and in which for the individual testing operations a slide is displaceable on the apparatus frame between stops, which are adjustable if needed, substantially radially toward and away from the gear wheel, the displacement being effected by a drive mechanism. Pivotably supported on the slide are two measuring feelers, the movement of which can be coupled counter to a pre-stressed spring force with the rotational movement of the gear wheel and which co-operate with travel transducers. The measuring feelers are arranged for contact with the same (right to left) flanks of adjacent teeth in the vicinity of the pitch circle of the gear wheel, and indexing means are connected with one of the measuring feelers, which is embodied as the reference feeler, so that at a predetermined measuring position of this feeler, the pickup or output of the measured value by the other measuring feeler is brought about on the one hand, while on the other hand the retraction of the measuring feeler out of the teeth of the gear and its variably retarded reinsertion into the teeth is controllable by indexing the drive mechanism of the slide accordingly.

U.S. patent application Ser. No. 477,785, filed Mar. 22, 1983, now U.S. Pat. No. 4,519,241, which is incorporated herewith by reference addresses the disadvantage in known measuring devices that two complete revolutions of the gear are required to detect errors in circumferential spacing at the right and left tooth flanks in succession and that between the two revolutions the measuring feeler must furthermore be moved over from one tooth flank to the other. This is very expensive in terms of time and money, a cost which moreover, in the case of testing on the gear-cutting machine itself, is considerably increased by the fact that the gear-cutting machine, which has a high hourly output, is not productive during the testing period.

OBJECT AND SUMMARY OF THE INVENTION

It is accordingly an object of the present invention to embody an apparatus of the general type described above in such a manner that the effects of recoiling are avoided, and that the provision for testing the circumferential spacing of both the right and left tooth flanks of the wheel in a single revolution of the gear wheel is retained.

This object is attained in accordance with the invention in that for a given measuring position of one measuring step, the feelers are moved by the gear wheel out of the neutral position of its spring arrangement into a deflected position (that is, deflected toward the right or left) under the influence of spring pre-stressing, and that the reference feeler can be adjustably positioned at two zero, or switching, points for the successive pickup and emission of a measured value by the second feeler at the right and left flank of a tooth gap.

Thus the present invention provides that the reference feeler has two switching points for one tooth gap it has approached, and these switching points are electrically offset between the two flanks defining the tooth gap relative to the reference feeler movement brought about by the gear wheel. Upon attaining a given switching point, the existing measured value representing the position of the second measuring feelers is processed further, so as to ascertain thereby the deviations in spacing. The apparatus according to the invention furthermore has the effect that the measuring feelers, prior to the actual emission of a measured value, are in a state of resilient contact on the flanks that have just previously been scanned, so that instantaneous recoiling cannot occur; instead, a calm reciprocal contact between the tooth flanks and the measuring feelers is established, whereby the measurement speed, or in other words the passage through the various individual measuring positions, can be kept quite high without the danger of errors in measurement physically caused by the apparatus itself.

Naturally, in terms of the reference feeler, the indexing or switching for the test apparatus must be arranged such that the retraction of the measuring feeler out of the gear teeth and the reinsertion thereof into the gear teeth in an adjustably retarded manner is effected such that in terms of the tooth gaps just approached at a given time, this movement will always take place only after both the right and the left tooth flanks of the gaps have been entered and tested.

It has proved to be suitable for the feelers to be guided parallel to themselves, with the aid of a parallelogram pre-stressed spring arrangement. It is equally suitable, however, to provide either ball bearing guides having pre-stressed compression or tension springs, or cross spring arrangements.

The invention will be better understood and further objects and advantages thereof will become more apparent from the ensuing detailed descripton of a preferred embodiment taken in conjunction with the drawings.

BRIEF DESCRIPTION OF THE DRAWINGS

FIG. 1a is a schematic illustration of the prior art control system for the invention shown in FIG. 1;

FIG. 6 is a schematic illustration of a mounting means for the feeler members.

DESCRIPTION OF THE PREFERRED EMBODIMENTS

Figure 1:
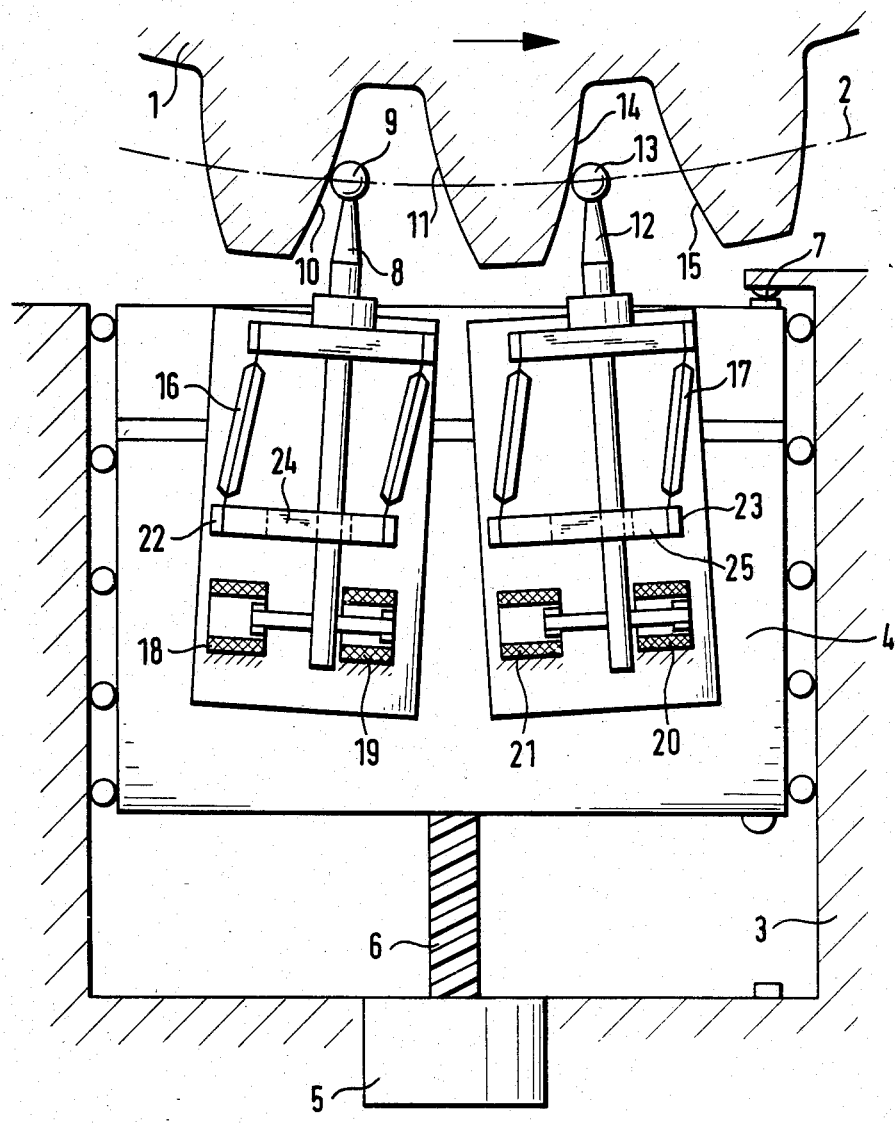
FIG. 1 is a schematic plan view of a test apparatus according to the invention.

FIG. 1 shows a gear wheel 1 having a pitch circle 2. The measuring apparatus, which is not shown in detail in terms of its physical structure, has a primary slide 4 displaceable on an apparatus housing 3 radially with respect to the gear wheel, being movable by a motor 5 and a spindle drive mechanism 6 toward and away from the gear wheel; the position in the direction toward the gear wheel is defined by a stop 7 integral with the housing, toward which stop the primary slide 4 moves.

As seen in FIG. 1a, the voltages generated in the measured value transducers 18, 19 and 20, 21 are carried via adapting amplifiers to the control and evaluation or recording unit, by generating in the amplifier/demodulator a direct voltage proportional to the measured value. Following a predetermined feeler deflection, the storage of the direct voltage in the "analog memory" is effected by means of the "zero comparator" and simultaneously the return travel of the measuring carriage is initiated via the "control unit". The signal present in the "analog memory" is digitized in the "A/D converter" and stored in memory in this form for later evaluation in the computer. After a period of time dictated via the "timing stage", the above-described measuring operation is started over again until the programmed number of teeth has been attained.

In the position of the slide 4 oriented toward the gear wheel 1, the measuring feeler 8 is located with its scanning ball 9 on the pitch circle 2, resting on the respective tooth flank 10 or 11, and the measuring feeler 12 rests with its scanning ball 13 on the pitch circle 2 on the respective tooth flank 14 or 15.

The measuring feelers are supported in respective parallelogram pre-stressed spring arrangements 16 and 17, which assures that the measuring feelers, upon deflection, will move at a tangent to the gear wheel 1. The two measuring feelers are provided at the back with two inductive transducers each, respectively numbered 18 and 19, and 20 and 21. The rearward holders 22 and 23, respectively, of the spring arrangements are firmly connected to the slide 4 and have respective openings 24 and 25 for connecting the measuring feelers with the inductive transducers. Naturally the inductive transducers 18, 19, 20 and 21 could also be replaced by an incremental measuring scale or similar means.

Figure 2:
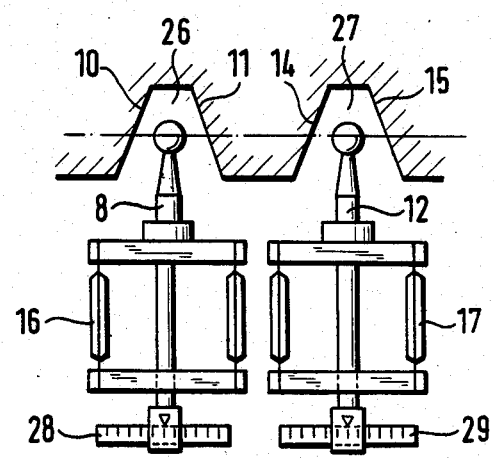
FIGS. 2-4 show the calibration of the test apparatus with the respective switching position of the reference feeler and the measuring feeler for the left and right flanks of two adjacent tooth gaps.
Figure 3:
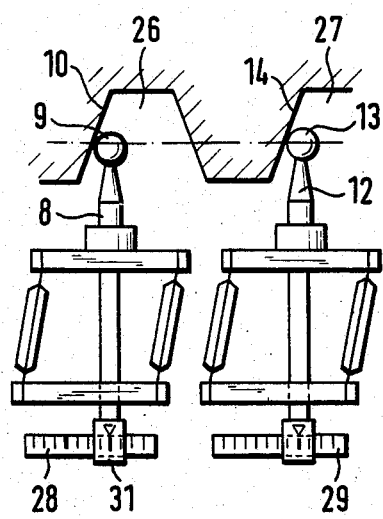
Figure 4:
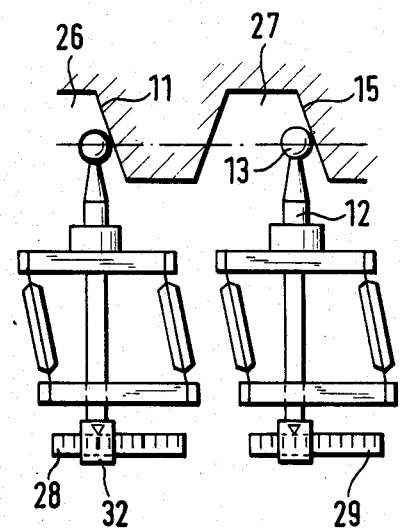

FIGS. 2–4 show how the zero balance of the test apparatus is accomplished.

In FIG. 2, the measuring feelers 8 and 12 are located in a neutral position, each in one of adjacent tooth gaps 26 and 27, between the two tooth flanks 10 and 11 or 14 and 15, respectively. The parallelogram pre-stressed spring arrangement 16 and 17 is shown in their relaxed, neutral positions and the means for transmission of the measured value, here shown in the form of two incremental traval transducers 28 and 29, is located in a zero position. Now as shown in FIG. 3, the feelers 8 (the reference feeler) and 12, or in other words their measuring balls 9 and 13, are positioned against the left flanks 10 and 14 in the adjacent tooth gaps 26 and 27, and the establishment of an electric switching point 31 is transmitted by the electrical measuring system 28, to a well known computer or any other suitable recording system, also the zero balance or the ascertainment of some arbitrary value at the electrical measuring system 29 is transmitted to the computer or other recording system.

The measuring feeler 8, together with the linear measuring system 28, is embodied as an indexing feeler, which upon passing through the switching point provided for it assures that the measured value at the electrical measuring system 29 is transmitted and recorded; this value arises as a result of the contact of the feeler 12 with its measuring ball 13 on the second left flank 14.

As shown in FIG. 4, the contact of the measuring feeler balls 9 and 13 against the right tooth flanks 11 and 15 is then effected in the tooth gaps 26 and 27, where the establishment of the electric switching point 32 is performed in the same manner at the measuring system 28, as is the zero balance to a predetermined value at the electrical measuring system 29. The test apparatus is thus balanced, using one tooth gap and an approach to the left and right flanks, so that the spacing between the flank surfaces of adjacent teeth can now be tested in one revolution of the test object.

One example of this follows, taken in conjunction with FIGS. 5a–5h.

Figure 5A:
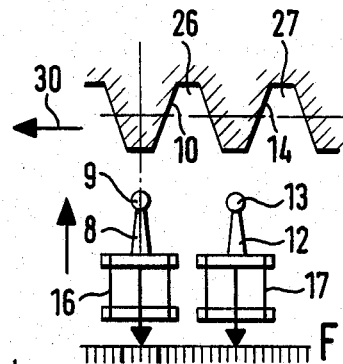
FIGS. 5a-h show the course of one measuring operation.
Figure 5B:
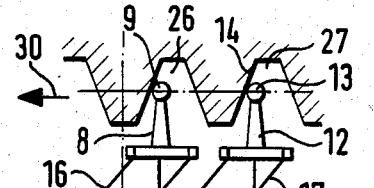

In FIG. 5a, the measuring feelers 8 and 12, or their measuring balls 9 and 13, are located in the position where they are just on the verge of being inserted into the tooth gaps 26 and 27. As a result of the continuous progression of the gear wheel, the two measuring balls 9 and 13, upon entering the tooth gaps 26 and 27, slide along the tooth flanks 10 and 14, until both of them attain the position represented in FIG. 1 by the stop 7. This sliding of the two measuring balls 9 and 13 along the flanks 10 and 14 can be prevented by raising these measuring balls; then upon attaining their position approximately on the pitch circle, they are released again, so that the two measuring balls 9 and 13 come to rest against the flanks 10 and 14.

The position described previously is shown in FIG. 5b, which at the same time also shows how the measuring feelers 8 and 12 are deflected with their parallelogram spring arrangements 16 and 17 counter to the direction of rotation 30 of the gear wheel.

Figure 5C:
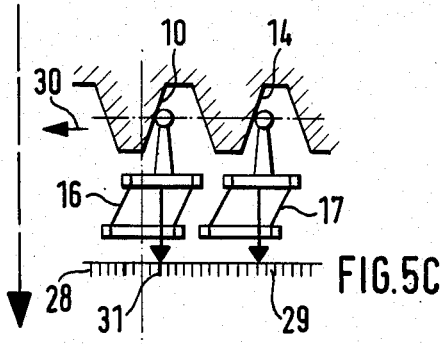

As a result of the continuous progression of the gear wheel in the direction of rotation 30, the two measuring feelers follow in this direction of rotation because of the pre-stressed tension of the springs 16 and 17, and the two parallelogram spring packets 16 and 17 are increasingly transferred into a less-extensively deflected position, until finally the electric switching point 31, which was previously established as shown in FIG. 3, is attained. In this position, the two measured values of the electrical measuring system 28 and 29 are transmitted and recorded. This position is shown in FIG. 5c.

Figure 5D:
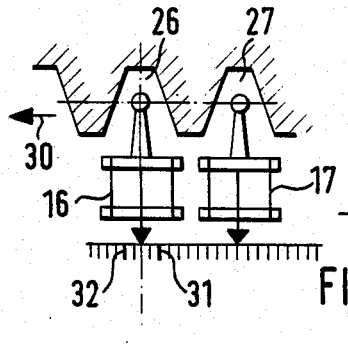
Figure 5H:
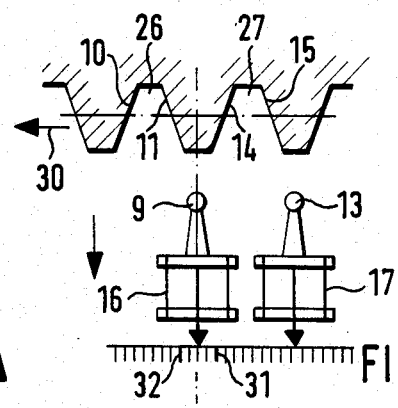
Figure 5G:
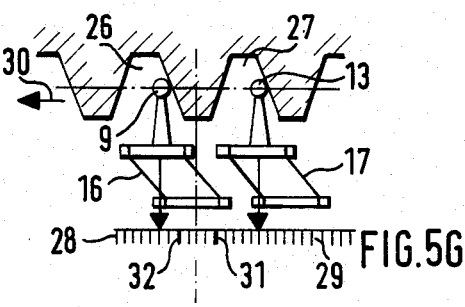

Finally, as the rotation of the gear wheel continues, the deflection of the parallelogram spring assemblies becomes equal to zero, as shown in FIG. 5d. Subsequently the right flanks 11 and 15 of the gear wheel move into contact with the two measuring feeler balls 9 and 13, as shown in FIG. 5e.

Figure 5F:
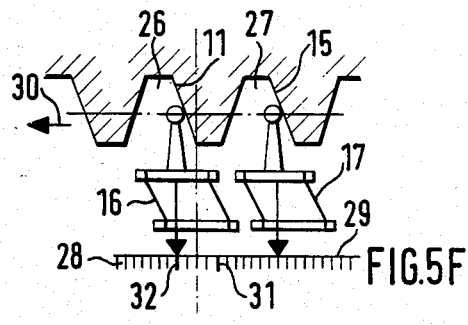
Figure 5E:
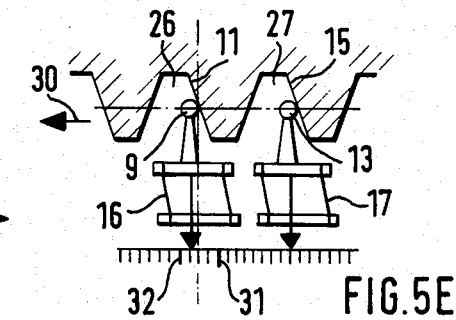

As the gear wheel continues to move as shown in FIG. 5f, the two parallelogram spring assemblies are deflected toward the opposite side, until finally the electrical zero point 32 at the measuring system 28 is attained again by the reference feeler or switching feeler. In this position, the measured values of the electrical measuring system 28 and the electrical measuring system 29 are transmitted and recorded and further processed so as to determine the deviations in spacing at the right flank relative to the signal transmitted by the electrical measuring system 29 as established with the electrical measuring system at set points 31 and 32.

As a result of the continuous progression of the gear wheel, the two parallelogram spring assemblies are deflected still more to the left, beyond the electrical switching point, as shown in FIG. 5g, until finally they are then retracted from the tooth gaps, as shown in FIG. 5h.

In the above-described manner, all the other left and right flanks of the gear wheel are tested in succession in the course of only one gear wheel revolution, and in so doing the spacing deviations are measured relative to the set points 31 and 32 previously established.

The mode of operation above described of this test apparatus is also applicable in conjunction with the embodiment shown in FIG. 6, which shows the gear wheel 1, the apparatus housing 3 in simplified form, the slide 4 that is displaceable radially relative to the gear wheel, and the measuring feelers 8 and 12 that are pivotably supported on the slide 4. The measuring feelers 8 and 12 are pivotable via roller bearings 33, 34 on blocks 35, 36 that are adjustable and fixable via screw connections 37, 38 and they transmit their pivoted position to the inductive transducers 18, 19 and 20, 21.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An automatic test apparatus for testing the circumferential spacing of adjacent teeth on gear wheels, in which for the testing operation a gear wheel is rotationally driven uninterruptedly at low speed in one rotational direction by means of a power source, and in which for the individual testing operations a slide is displaceable on an apparatus frame by a drive mechanism substantially radially toward and away from the gear wheel between adjustable stops, said apparatus including first and second parallel supported gear teeth feelers movably supported on said slide in parallel relationship, said first and second feelers being movable counter to a spring force such as to be moved successively into contact with corresponding right and left flanks of adjacent gear teeth on said gear wheel during rotational movement of the gear wheel, said first and second feelers being oriented for contact with corresponding flanks of adjacent teeth in the vicinity of a pitch circle of the gear wheel on corresponding (right or left) flanks of adjacent gear teeth, first and second travel transducers secured on said slide in cooperation with said first and second feelers respectively for establishing separate predetermined switching points at which signals corresponding to a measured value are transmitted to a memory means for storage, said first and second parallel supported gear teeth feelers being transferred into a deflected position by the gear teeth away from a neutral position thereof between two adjacent tooth flanks thereby contacting right and left flanks of adjacent gear teeth for establishing separate switching points for a first and second switching position, switching means connected with said first feeler, embodied as a reference feeler, for triggering transmission of signals of a measured value determined by said second parallel supported gear teeth feeler at said established separate switching points whereby signals according to values measured by said second feeler for each established switching point for each tooth gap is transmitted to said memory means for storage at said gear wheel is rotated through 360 degrees.

2. An apparatus as defined by claim 1, further comprising a parallelogram spring arrangement for guiding the feelers parallel to themselves.

3. A method for measuring the circumferential spacing of adjacent teeth in a gear wheel by use of parallel supported first and second feelers comprising rotating said gear wheel in a uniform low speed,
positioning first and second transducers relative to said parallel supported first and second feelers,
directing said first and second parallel feelers toward said gear wheel such that each of said feelers enter adjacent gaps between adjacent teeth on said wheel such that each of said feelers are incident on a tooth flank of a back surface of adjacent teeth in the direction of rotation of the wheel to establish a first switching point for said first feeler,
directing said first and second parallel feelers onto a tooth flank of a front surface of said adjacent teeth to establish a second switching point for said first feeler,
determining a deflection of each of said first and second parallel feelers for the back and front flanks of each tooth in succession and triggering signals of measured values determined by said second feeler at said established first and second switching points for each tooth gap as said first feeler is deflected across each of said first and second switching points and directing the measured valves of said second feeler as triggered signals to a memory means for storage, and continually comparing the measured values successively stored in the memory means for each corresponding tooth flank of each gap formed by the teeth on said gear during rotation of said gear to determine any deviation in the measure of corresponding tooth flanks.

* * * * *